United States Patent [19]

Morishita

[11] Patent Number: 5,067,577
[45] Date of Patent: Nov. 26, 1991

[54] MOTOR-DRIVEN TYPE FRONT AND REAR WHEEL STEERING APPARATUS

[75] Inventor: Mitsuharu Morishita, Himeji, Japan
[73] Assignee: Mitsubishi Denki K.K., Tokyo, Japan
[21] Appl. No.: 523,790
[22] Filed: May 16, 1990
[30] Foreign Application Priority Data May 24, 1989 [JP] Japan ................................. 1-131825

[51] Int. Cl.$^5$ ............................................... B62D 5/04
[52] U.S. Cl. ................................. 180/79.1; 180/140; 180/142
[58] Field of Search ...................... 180/79.1, 140, 142, 180/143; 280/91

[56] References Cited

U.S. PATENT DOCUMENTS

| | | | |
|---|---|---|---|
| 4,313,514 | 2/1982 | Furukawa et al. | 180/143 |
| 4,597,462 | 7/1986 | Sano et al. | 180/143 X |
| 4,640,379 | 2/1987 | Shibahata et al. | 180/143 X |
| 4,724,916 | 2/1988 | Morishita et al. | 180/79.1 |
| 4,753,310 | 6/1988 | Hashimoto | 180/79.1 |
| 4,782,907 | 11/1988 | Morishita et al. | 180/140 |
| 4,786,065 | 11/1988 | Donges et al. | 280/91 |
| 4,811,969 | 3/1989 | Sugiyama | 280/91 X |

FOREIGN PATENT DOCUMENTS 2558130 1/1985 France .
2083422 3/1982 United Kingdom .

Primary Examiner—Charles A. Marmor
Assistant Examiner—Paul Dickson
Attorney, Agent, or Firm—Sughrue, Mion, Zinn Macpeak & Seas

[57] ABSTRACT

A motor-driven type front and rear wheel steering apparatus which comprises a steering sensor to detect at least one of a steering torque and a steering angle, a motor-driven type power-assisted steering unit to assist the steering of the front wheels in response to a signal from the steering sensor, a motor-driven type rear wheel steering unit to drive the steering of the rear wheels in response to at least one signal of a signal indicating the steering torque and a signal indicating the steering angle which are generated from the steering sensor, and a control unit which receives a plurality of signals from each of the steering sensor, a vehicle speed sensor, a motor turning angle speed sensor and a rear wheel steering angle sensor to control the motor-driven type power-assisted steering unit and the motor-driven type rear wheel steering unit, wherein the control unit actuates only the motor-driven type power-assisted steering unit when the automobile stops or runs at a low speed, and actuates either one between the motor-driven type power-assisted steering unit and the motor-driven type rear wheel steering unit when the automobile runs at an intermediate speed or at a high speed.

2 Claims, 2 Drawing Sheets

MOTOR-DRIVEN TYPE FRONT AND REAR WHEEL STEERING APPARATUS

The present invention relates to a motor-driven type front and rear wheel steering apparatus having a motor-driven type power-assisted steering unit and a motor-driven type rear wheel steering unit which assist in reducing the load to a steering device by a torque produced by a motor.

A load to the steering of the motor-driven type power-assisted steering unit varies as follows. A steering torque to turn the wheels at the time of the stopping of the automobile is the greatest because a resistance of friction due to the contact of the tires to a road surface is the greatest. The resistance of friction gradually decreases as a speed of the automobile increases, with the result of decreasing the load to the steering. When the automobile exceeds a certain speed, a reaction force to the steering results from an arrangement for aligning wheel-related elements, whereby the steering load gradually increases.

Accordingly, it is necessary to provide an assisted torque depending on the steering torque. Since the assisted torque is in proportion to an electric current for driving the motor, a current supplied to the motor increases, namely, an electric load to the battery of the automobile increases.

On the other hand, a motor current becomes large when the motor-driven type rear wheel steering unit is to be subjected to inverse phase control at a low speed region.

As described above, in the automobile which is provided with both the motor-driven type power-assisted steering unit and the motor-driven type rear wheel steering unit, it is necessary to supply a large electric current in the steering operations when the automobile is stopped or is driven at a low speed. Accordingly, a shortage of charged electricity in the battery is apt to be caused in an automobile having a small displacement capacity which has normally a small capacity of battery or charging generator.

Even if the capacity of battery or charging generator is increased for the automobile having a small displacement capacity, there is apt to be caused an engine stall or unstable revolution in idling operations because of a rapid increase of an electric load due to, for instance, a sudden steering operation for the steering wheel. This is because an idle torque of the engine is small.

Further, an attempt to improve the engine so as not to cause the engine stall or the unstable idling operations creates a problem that the fuel consumption efficiency and the follow-up characteristic of the engine becomes poor.

It is an object of the present invention to provide a motor-driven type front and rear wheel steering apparatus capable of improving reliability in driving operations in a small-sized automobile.

In accordance with the present invention, there is provided a motor-driven type front and rear wheel steering apparatus which comprises a steering sensor to detect at least one of a steering torque and a steering angle, a motor-driven type power-assisted steering unit to assist in steering the front wheels in response to a signal from the steering sensor, a motor-driven type rear wheel steering unit to drive the steering of the rear wheels in response to at least one of a signal indicating the steering torque and a signal indicating the steering angle which are generated from the steering sensor, and a control unit which receives a plurality of signals signals from lack of the steering sensor, a vehicle speed sensor, a motor turning angle speed sensor and a rear wheel steering angle sensor to control the motor-driven type power-assisted steering unit and the motor-driven type rear wheel steering unit, wherein the control unit actuates only the motor-driven type power-assisted steering unit when the automobile stops or runs at a low speed, and actuates at least one between the motor-driven type power-assisted steering unit and the motor-driven type rear wheel steering unit when the automobile runs at an intermediate speed or at a high speed.

A preferred embodiment of the present invention will be described with reference to the drawings.

Figure 1:
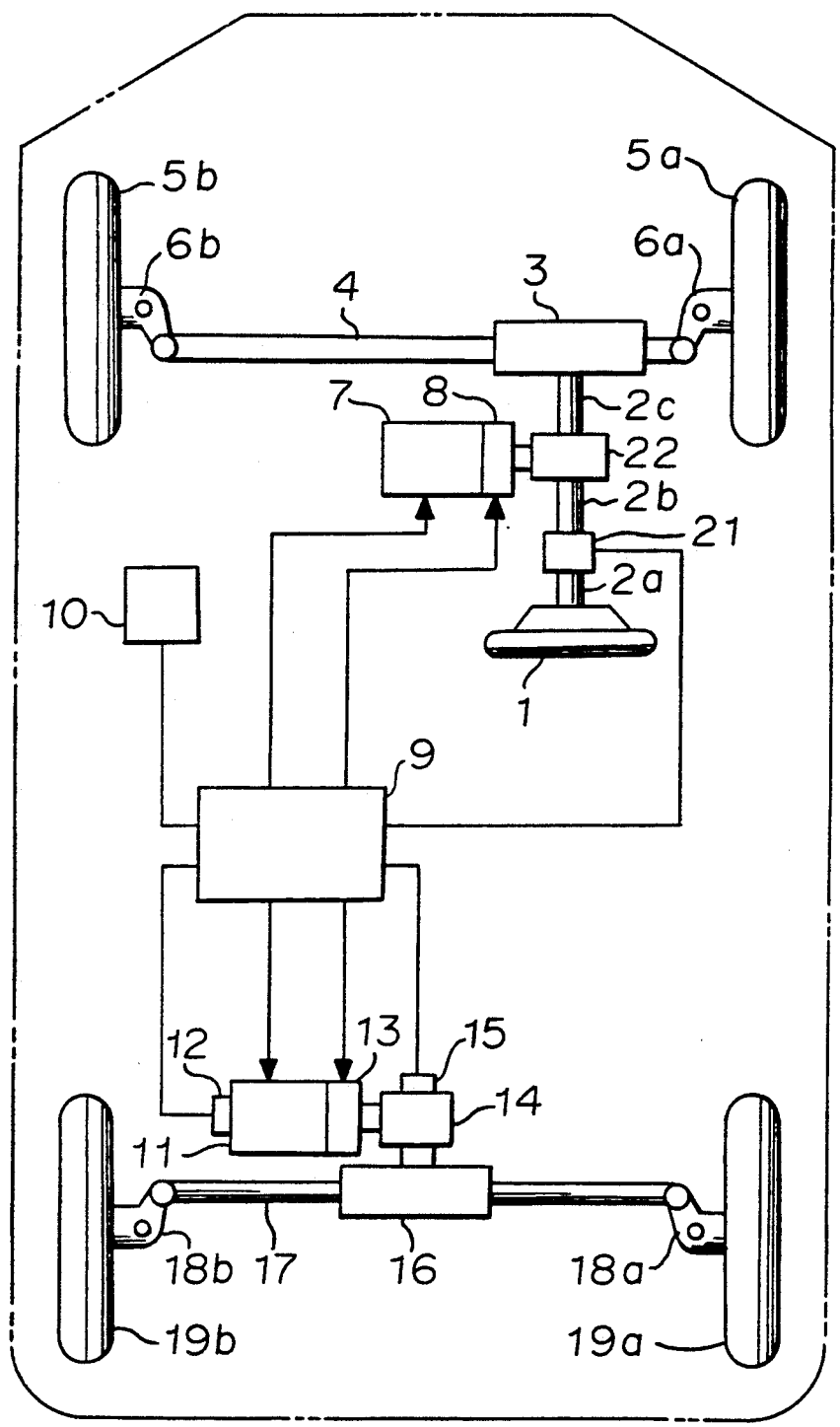
FIG. 1 is a diagram showing an embodiment of the motor-driven type front and rear wheel steering apparatus according to the present invention.

FIG. 1 is a diagram showing a preferred embodiment of the motor-driven type front and rear wheel steering apparatus of the present invention, wherein a reference numeral 1 designates a steering wheel which receives a steering torque by a driver, a numeral 21 designates a steering sensor which includes a torque sensor to output an electric signal in response to a torque applied to the steering wheel 1 and a steering wheel angle sensor to output a steering wheel angle signal, a numeral 2a designates a first steering shaft which connects the steering wheel 1 to the steering sensor 21, a numeral 2b designates a second steering shaft which connects the steering sensor 21 to a motor speed reducing unit 22, a numeral 2c designates a third steering shaft which connects the first motor speed reducing unit 22 to a front wheel steering gear box 3 which includes a moving direction changing means such as a rack, a pinion and so on, a numeral 4 designates a tie rod for driving the front wheels, a numeral 5a designates a right front wheel, a numeral 5b designates a left front wheel, a numeral 6a designates a first right knucle arm connected to the tie rod 4 to control for steering the right front wheel 5a, a numeral 6b designates a first left knucle arm connected to the tie rod 4 to control for steering the left front wheel 5b, a numeral 7 designates a first motor to assist driving the steering of the front wheels, a numeral 8 designates a first electromagnetic clutch which mechanically connects or breaks the output of the motor 7, a numeral 11 designates a second motor to control for steering the rear wheels, a numeral 12 designates a turning angle speed sensor for the motor 11, a numeral 13 designates a second electromagnetic clutch which connects or breaks the output of the motor 11, a numeral 14 designates a second motor speed reducing unit having a construction which prevents the self-rotation by a reactive force of the rear wheels 19a, 19b even when the clutch 13 is actuated to break the output of the motor 11, a numeral 15 designates a rear wheel steering angle sensor, a numeral 16 designates a rear wheel steering gear box which is driven by the output of the motor speed reducing unit 14 and which includes a moving direction changing means such as a rack, a pinion and so on, a numeral 17 designates a tie rod for driving the rear wheels, numerals 19a, 19b designate respectively the right and left rear wheels, a numeral 18a designates a second right knucle arm connected to the tie rod 17 to move for steering the right gear wheel 19a, a 18b designates a second left knucle arm connected to the tie rod 17 to move for steering the left rear wheel 19b, and a numeral 9 designates a control unit which has both functions for motor-driven type power-assisted steering control and motor-driven type rear wheel steering control. The unit for performing the function of the motor-driven type power-assisted steering control is to control the first motor 7 and the first clutch 8 in response to a signal indicating an automobile speed output from the speed sensor 10 and a torque signal output from the steering sensor 21 to thereby control the assisted steering operation of the front wheels. The unit for performing the motor-driven type rear wheel steering control is to control the motor 11 and the clutch 13 in response to the signal indicating automobile speed output from the speed sensor 10, the torque signal output from the steering sensor 21, a motor revolution angular speed signal output from the motor turning angle speed sensor 12 and a rear wheel steering angle signal output from the rear wheel steering angle sensor 15 to thereby control the steering of the rear wheels.

Figure 2:
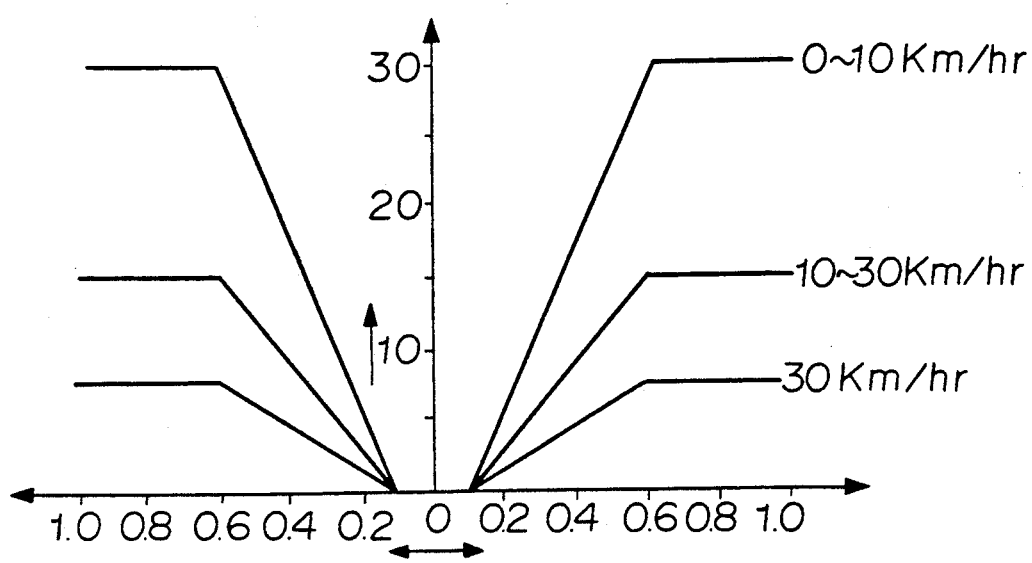
FIG. 2 is a characteristic diagram showing a relation of a steering torque to a motor current which is effected by a motor-driven type power-assisted steering control unit.
Figure 3:
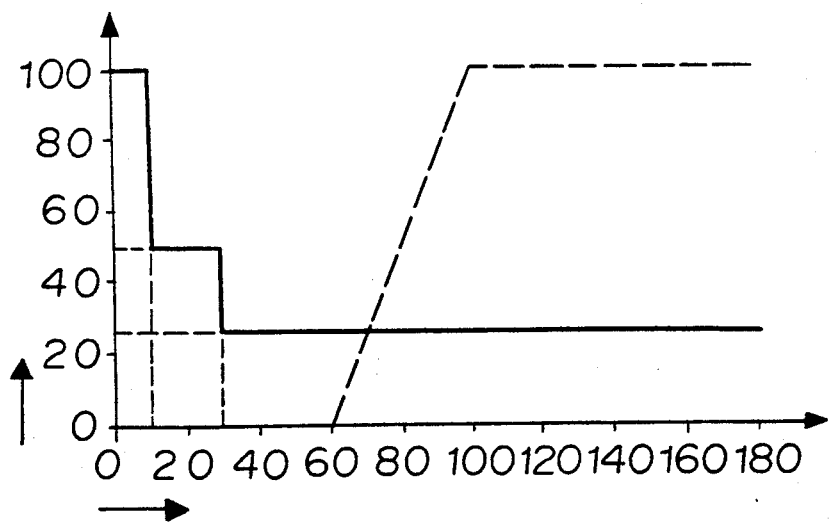
FIG. 3 is a diagram showing a relation of an automobile speed to functions for the power-assisted steering control and a motor-driven type rear wheel steering control.

FIG. 2 is a diagram showing a relationship between steering torque vs motor current which shows the motor-driven type power-assisted steering control function performed by the control unit 9 shown in FIG. 1. FIG. 3 is a automobile speed characteristic diagram showing both functions of the motor-driven type power-assisted steering control and the motor-driven type rear wheel steering control performed by the control unit 9 shown in FIG. 1.

The operation of the steering apparatus having the above-mentioned construction of the present invention will be described with reference to FIGS. 1 through 3.

When the engine is started, power from the battery of 12V (not shown) is supplied to the control unit 9 to actuate it. At this moment, since the automobile is in a stop state, the speed sensor outputs a signal corresponding to 0 km/h. In this state, when the steering wheel 1 is operated, signals indicating a steering torque applied to the steering wheel and a steering wheel turning angle are output from the steering sensor 21. Accordingly, the control unit 9 outputs control signals to the motor 7 and the electromagnetic clutch 8 in response to the output of the steering sensor 21 to thereby control the power as shown in FIG. 2. At this moment, however, the motor-driven type rear wheel steering control function is not actuated, and the motor 11 and the electromagnetic clutch 13 are in a state of interruption.

When the speed of the automobile gradually increases, the motor-driven type power-assisted steering control function varies the motor current characteristic as shown in FIG. 2 so that the maximum limit current for the motor is reduced as the automobile speed increases. When the speed reaches a point b, e.g., an intermediate speed, the current becomes constant.

Further, when the automobile speed exceeds a point c, e.g., a high speed, the motor-driven type rear wheel steering control function is effected, whereby the rear wheels are controlled to be the same phase in response to the steering angle signal from the steering sensor 21. In this case, control is made so that the ratio of the steering of the front wheels to the rear wheels becomes large depending on the increase of the automobile speed as shown in FIG. 2.

Thus, the steering control apparatus of the present invention is mounted on an automobile having a small displacement capacity. When the automobile runs at a predetermined speed or lower, only the motor-driven type power-assisted steering control function is effected, whereby a large electric current is prevented from flowing when steering operations are conducted at the time of the stopping of the automobile, or at the time of running at a low speed. Accordingly, it is unnecessary to increase the capacity of the battery or the charging generator. Further, an engine stall or an unstable idling revolution can be eliminated.

In the present invention, since both the motor-driven type power-assisted steering function and the motor-driven type rear wheel steering function are usable, reliability on a small-sized automobile at a time of running at a high speed can be improved. Further, the steering apparatus of the present invention can be provided at a low cost.

I claim:

1. A motor-driven type front and rear wheel steering apparatus for steering the front and rear wheels of an automobile while preventing excessive current draw from a battery or a generator of the automobile, said apparatus comprising:

a steering sensor to detect at least one of a steering torque and a steering angle, a motor-driven type power-assisted steering unit to assist in steering the front wheels in response to a signal based on at least one of said steering torque and said steering angle from the steering sensor, a motor-driven type rear wheel steering unit to drive the steering of the rear wheels in response to at least one of a signal indicating the steering torque and a signal indicating the steering angle which are generated from the steering sensor, and a control unit which receives a plurality of signals from each of the steering sensor, a vehicle speed sensor, a motor turning angle speed sensor and a rear wheel steering angle sensor so as to control the motor-driven type power-assisted steering unit and the motor-driven type rear wheel steering unit, wherein the control unit actuates only the motor-driven type power-assisted steering unit when the automobile stops or runs at a low speed, and actuates a selected one of the motor-driven type power-assisted steering unit and the motor-driven type rear wheel steering unit when the automobile runs at an intermediate speed or at a high speed.

2. The motor-driven type front and rear wheel steering apparatus according to claim 1, wherein the motor-driven type power-assisted steering unit reduces a current supplied to a motor as the speed of said automobile increases, and makes the current constant when the speed reaches a predetermined value.

* * * * *